(12) United States Patent
Dahiwadkar

(10) Patent No.: US 8,200,639 B2
(45) Date of Patent: Jun. 12, 2012

(54) SECURE DATA SCRUBBING UTILITY

(76) Inventor: Sanjeevkumar V. Dahiwadkar, Ellicott City, MD (US)

( * ) Notice: Subject to any disclaimer, the term of this patent is extended or adjusted under 35 U.S.C. 154(b) by 276 days.

(21) Appl. No.: 12/384,668

(22) Filed: Apr. 7, 2009

(65) Prior Publication Data
US 2009/0251818 A1  Oct. 8, 2009

Related U.S. Application Data

(60) Provisional application No. 61/123,297, filed on Apr. 7, 2008.

(51) Int. Cl.
G06F 7/00 (2006.01)
G06F 17/00 (2006.01)

(52) U.S. Cl. .................................. 707/692; 707/662

(58) Field of Classification Search ............ 707/999.101, 707/692, 662
See application file for complete search history.

(56) References Cited

U.S. PATENT DOCUMENTS

| | | | | |
|---|---|---|---|---|
| 6,070,174 A * | 5/2000 | Starek et al. | ............ | 1/1 |
| 2002/0181134 A1* | 12/2002 | Bunker et al. | ............ | 360/60 |
| 2004/0114265 A1* | 6/2004 | Talbert | ............ | 360/60 |
| 2006/0080554 A1* | 4/2006 | McDonald et al. | ............ | 713/189 |
| 2007/0061567 A1* | 3/2007 | Day et al. | ............ | 713/159 |
| 2010/0138619 A1* | 6/2010 | Benavides | ............ | 711/159 |

OTHER PUBLICATIONS

P. Gutmann, "Secure Deletion of Data from Magnetic and Solid-State Memory", Sixth USENIX Security Symposium Proceedings, San Jose, Calif. USA, Jul. 22-25, 1996, pp. 77-90.*

* cited by examiner

Primary Examiner — Alexey Shmatov
(74) Attorney, Agent, or Firm — Ober, Kaler, Grimes & Shriver; Royal W. Craig

(57) ABSTRACT

A software method and utility for performing a user-controlled data shredding operation for overwriting an entire file structure inclusive of all black-shaded blocks of data associated with a particular file of interest, then removing all references to the data structure in the operating environment, then renaming the data structure, and finally deleting the data structure. This ensures utmost security of the scrubbed data, plus it gives a user a number of scrubbing options including a one-click scrubbing feature and scheduled scrubbing operations.

16 Claims, 6 Drawing Sheets

Wipeout Bin on windows desktop

FIG. 9

SECURE DATA SCRUBBING UTILITY

CROSS-REFERENCE TO RELATED APPLICATION(S)

The present application derives priority from U.S. provisional application Ser. No. 61/123,297 filed Apr. 7, 2008.

BACKGROUND OF THE INVENTION

1. Field of the Invention

The present invention relates to a system for scrubbing data from a computer storage medium and, more particularly, to a software utility for more secure hard disk data scrubbing.

2. Description of the Background

Computers rely on magnetic or optical storage media for storage and retrieval of information. The information is stored as data on magnetic disks, magneto-optical disks, optical disks such as in a rewritable CD, and others. There is often a need to scrub stored information such as, for example, when records have expired and there is no longer any need to keep the information. Storage facilities are increasingly vulnerable to security breaches by hackers obtaining illicit access to the storage facility via a data network. Thus, is becomes important to ensure that data is securely scrubbed beyond retrieval, such as by deleting the entry of a particular data file or preferably by overwriting the data.

There are known techniques for over-writing data by a so-called shredding pattern. For example, United States Patent Application Publication No. 20020181134 to Bunker et al. discloses the application of user-selectable shredding patterns. In addition, a discussion of shredding operations appears in P. Gutmann, "Secure Deletion of Data from Magnetic and Solid-State Memory", Sixth USENIX Security Symposium Proceedings, San Jose, Calif. USA, Jul. 22-25, 1996, pp. 77-90.

Unfortunately, simple shredding patterns can be reversed and data reconstructed, and so conventional data deletion utilities are not exhaustive enough to ensure secure deletion of the data. What is desirable is a flexible software utility that allows a user to control data shredding operations including the following four steps:

1. Overwriting file data a user-defined number of times;
2. Removing the references for a file from operating system environment (Recent List, Documents short cuts, registry references to the file)
3. Renaming the file; and
4. Deleting the file.

SUMMARY OF THE INVENTION

Accordingly, it is an object of the invention to provide a software utility inclusive of a graphical user interface (GUI) that allows a user to preset a desired data shredding operation, including overwriting data structures any number of times, removing all references to the data structure in the operating environment, renaming the data structure, and finally deleting the data structure, thereby ensuring utmost security of the scrubbed data.

In accordance with the foregoing object, the present invention is a software utility accessible through either a graphical user interface (GUI) or by direct call from a scheduler utility, command line, third party program or otherwise, which in all cases allows a user to preset a desired data shredding operation including overwriting data structures any number of times, removing all references to the data structure in the operating environment, renaming the data structure, and finally deleting the data structure, thereby ensuring utmost security of the scrubbed data. Specifically, the utility will execute a scrubbing sequence pursuant to the following four-step processing logic:

1. Overwrite all data blocks associated with a given file;
2. Remove the references for the file from Windows™ environment (Recent List, Documents short cuts, registry references to the file);
3. Rename the file;
4. Delete the file.

This process ensures utmost security of the scrubbed data, plus it gives a user a number of scrubbing options including a one-click scrubbing feature and scheduled scrubbing operations.

BRIEF DESCRIPTION OF THE DRAWINGS

Other objects, features, and advantages of the present invention will become more apparent from the following detailed description of the preferred embodiment and certain modifications thereof, in which:

Figure 9:
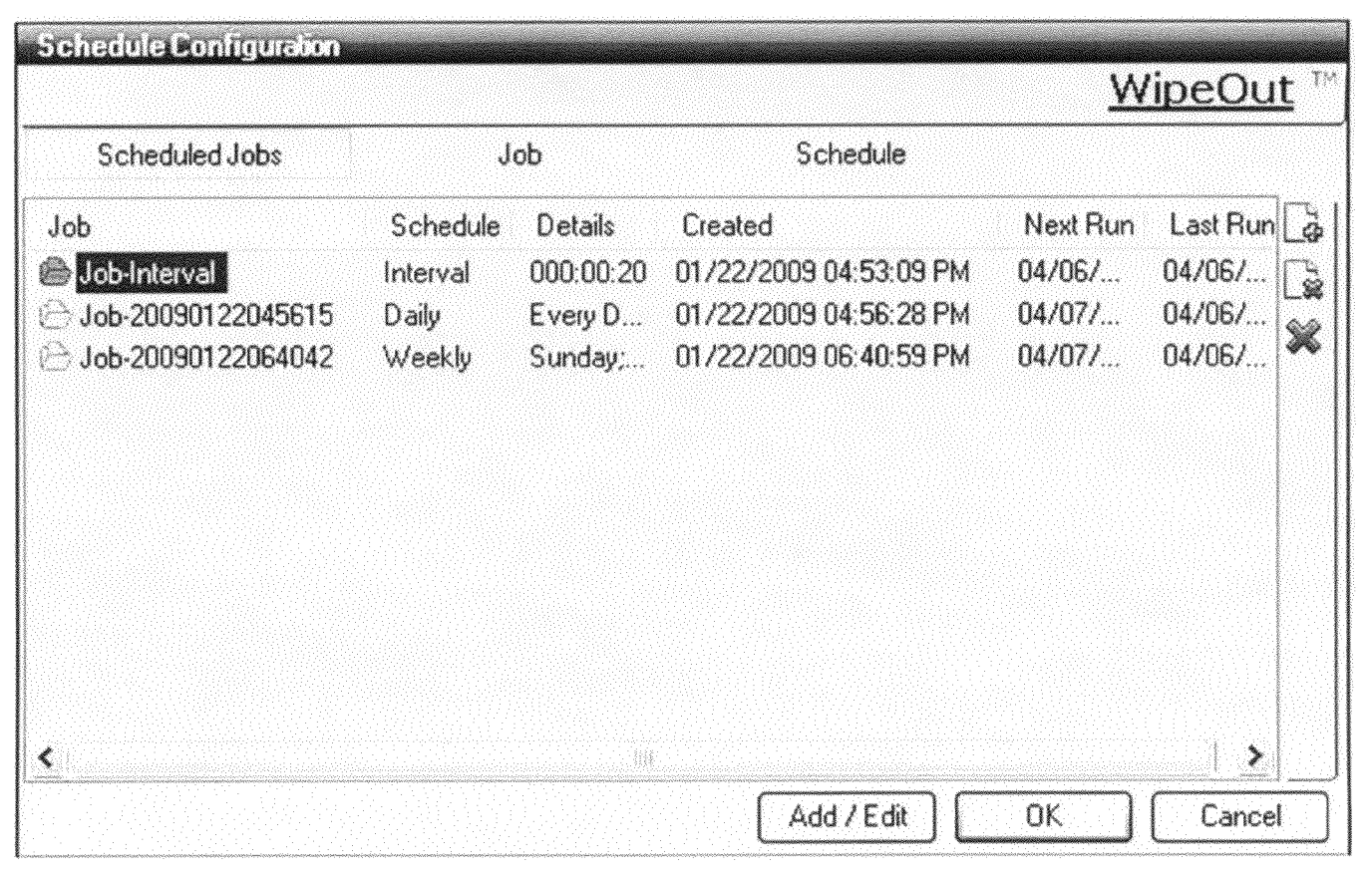

FIG. 9 is a screen print of an exemplary Scheduler Job List.

DETAILED DESCRIPTION OF THE PREFERRED EMBODIMENTS

The present invention is a software utility accessible through either a graphical user interface (GUI) or by direct call from a scheduler utility, command line, third party program or otherwise, which in all cases allows a user to preset a desired data shredding operation including overwriting data structures any number of times, removing all references to the data structure in the operating environment, renaming the data structure, and finally deleting the data structure, thereby ensuring utmost security of the scrubbed data.

Figure 1:
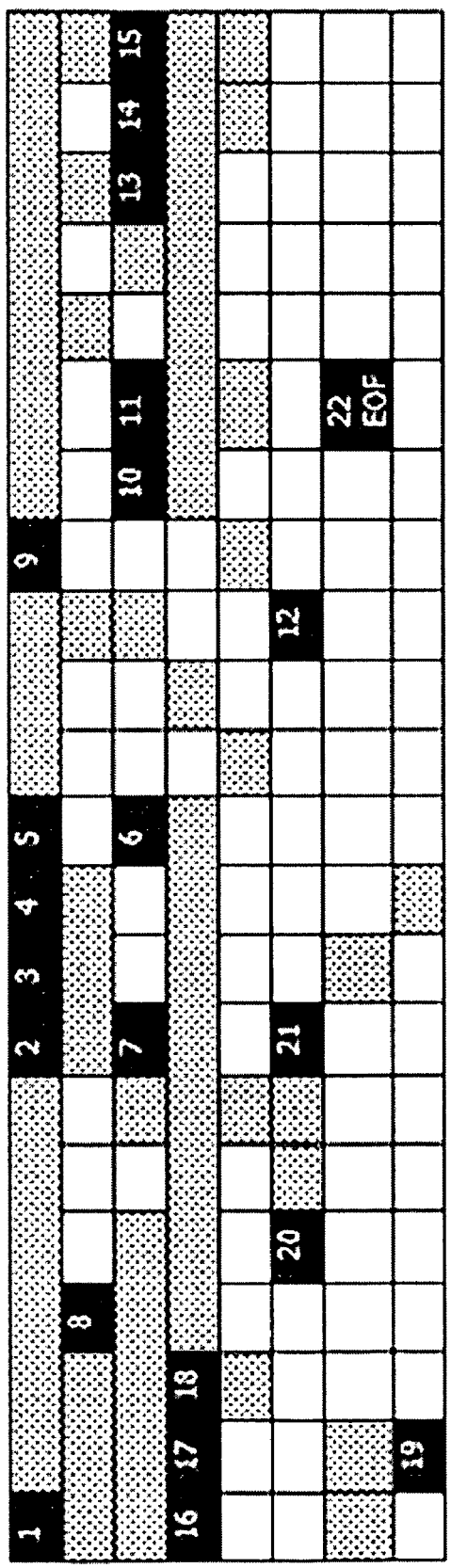
FIG. 1 illustrates how file information is stored in blocks on a typical computer storage medium.

FIG. 1 illustrates how file information is stored in blocks on a typical computer storage medium. Each white block is available (unused) storage, and each grey-shaded block contains data associated with other files. Each black-shaded block includes data associated with a particular file of interest plus data indicating where that block fits within the file, and data indicating where to find next logical block of information. The file ends with a special End-of-file indicator (EOF) in the $22^{nd}$ block. Note that blocks may be contiguous and adjacent, or discontiguous and spread across the storage medium in a random pattern.

The present executable software utility performs a user-defined shredding operation for overwriting an entire file structure inclusive of all black-shaded blocks of data associated with a particular file of interest up to and including the EOF block, the overwriting occurring any user-selectable number of times, followed by removal of all references to the data structure in the operating environment, then renaming the data structure, and finally deleting the data structure, thereby ensuring utmost security of the scrubbed data.

The software utility is herein described in the context of a Microsoft Windows™ environment, though one skilled in the art will understand that the methods employed are equally applicable to Unix™ or any other operating system.

Figure 2:
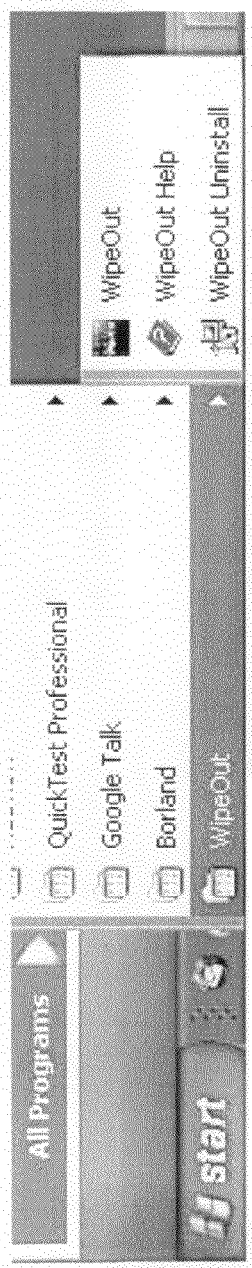
FIG. 2 is a screen print of the WipeOut executable icon placed on the Windows™ Start Menu.
Figure 3:
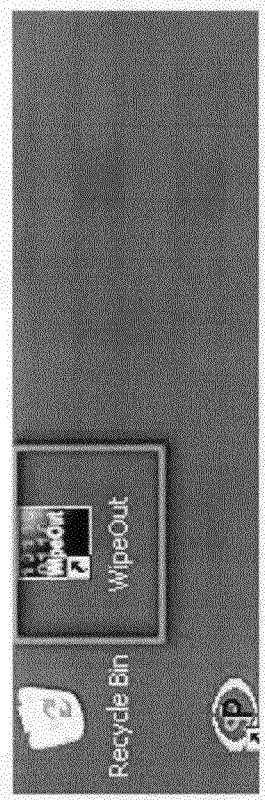
FIG. 3 is a screen print of the Windows™ desktop shortcut for accessing the WipeOut executable from the Windows™ Desktop.
Figure 4:
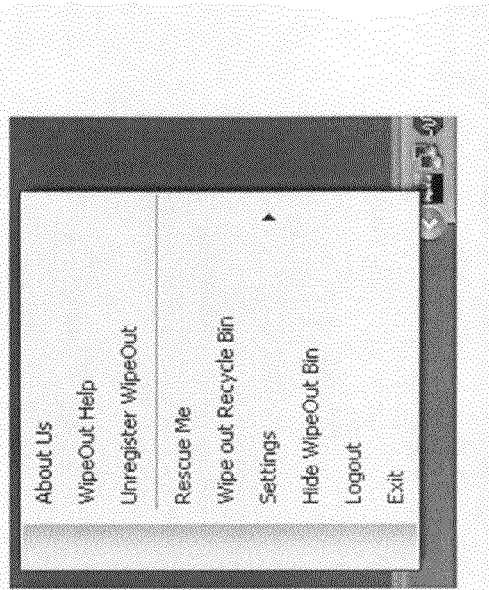
FIG. 4 is a screen print of the Windows™ icon for accessing the WipeOut executable from the Windows™ System Tray.

The software utility may be downloaded as a compressed zip folder, such as WipeOutSetup.zip, which when unzipped initiates an installation process. The installation process installs and registers the software utility executable program, Wipeout.exe, as well as a scheduler utility, and supporting data files, and provides the user with a plurality of access points in the Windows™ user environment. As see in FIG. 2, the user may access the WipeOut executable from the Windows™ Start Menu. As seen in FIG. 3, a Windows™ desktop shortcut is installed and the user may access the WipeOut executable from the Windows™ Desktop. Alternately, as seen in FIG. 4, a Windows™ an icon is placed on the Windows™ System Tray and the user may access the WipeOut executable therefrom. In addition, a "WipeOut Bin" similar to the Windows erase trash can is placed on the Windows™ Desktop, as described below. Finally, the WipeOut executable may be accessed by direct call from a provided scheduler utility (to be described), command line, or third party program.

Upon first-time execution the user must register and activate the WipeOut executable by using a ten digit activation key provided by the vendor, typically an email sent to the user upon purchasing a program license. Once the registration information is sent and the activation key is entered, the user may freely run the program.

Initially, the WipeOut executable presents a user interface with a series of drop-down menu choices, the same menu choices being accessible by right clicking the icon on the Windows™ System Tray.

Figure 5:
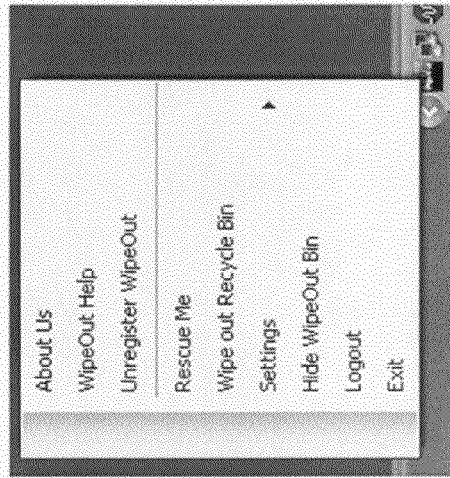
FIG. 5 is a screen print of the WipeOut executable menu choices.

FIG. 5 is a screen print of the WipeOut menu choices which include "About Us" (vendor contact information), "WipeOut Help" (a help function), "Unregister WipeOut" (to uninstall the program), "Rescue Me", "WipeOut Recycle Bin" (to salvage previously-erased files); "Settings" (Setup Options); "Hide WipeOut Bin" (to hide the WipeOut Bin on the Windows™ Desktop); "Logout" and "Exit".

In order to run the WipeOut executable, the program must be setup and though default setup options may be provided the user may program a user-defined shredding operation using the Settings selection from the WipeOut menu choices of FIG. 5.

Figure 6:
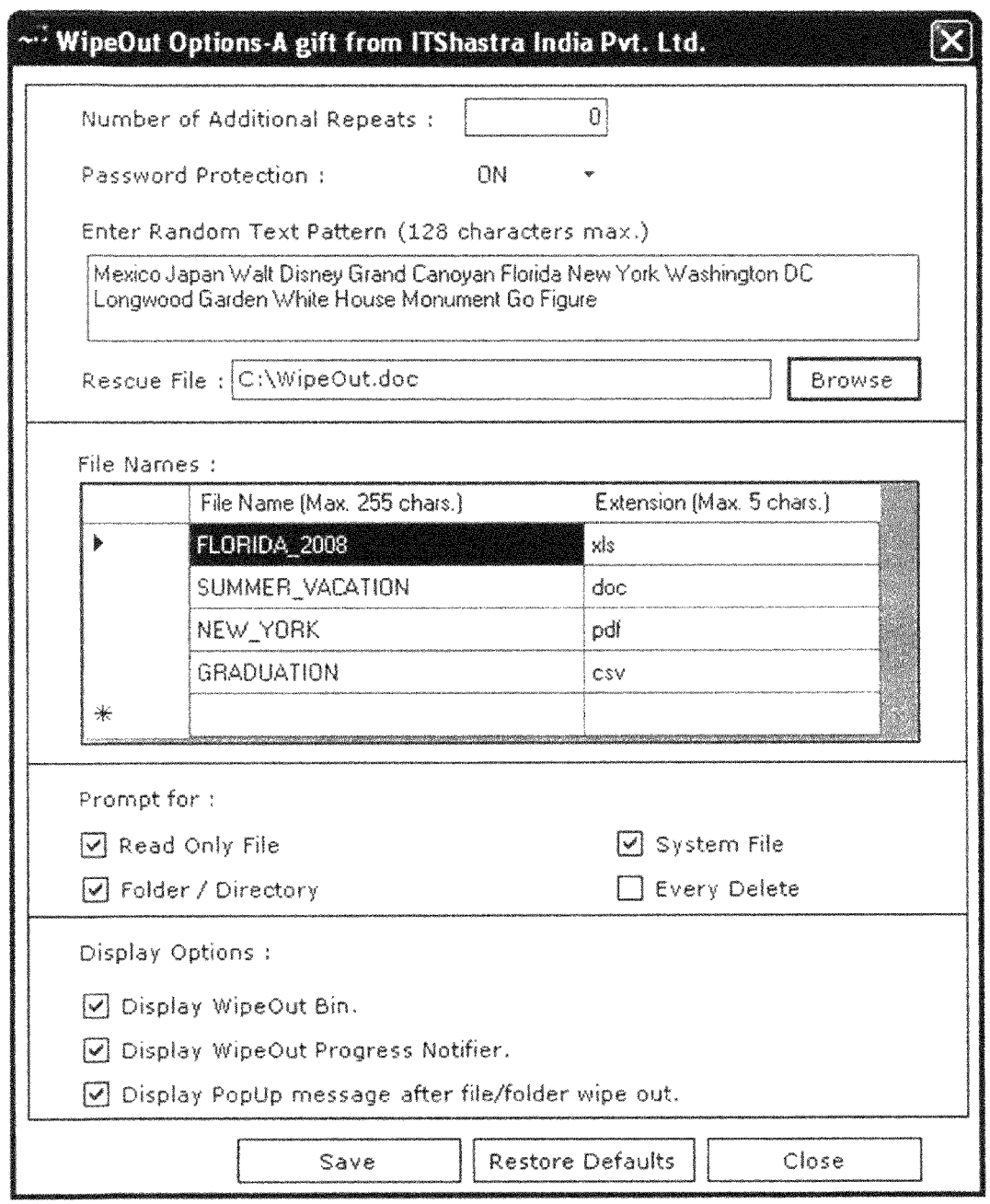
FIG. 6 is a screen print of the "Option Setup" interface by which the user can set the desired parameters for the scrubbing operations.

This engenders an "Option Setup" interface as shown in FIG. 6 by which the user can set the desired parameters for the scrubbing operations. These parameters generally include the number of times that data structures should be overwritten, a password for accessing the utility, preferred file extensions for renaming the data structures, and various processing parameters and backup options. Specifically, the utility provides the following "Option Setup" options by which the user can set the desired parameters for the scrubbing operation. This Options Screen provides a convenient means for entry (at top) of the Number of Additional Repeats N to by which the utility should overwrite the data, and whether or not Password Protection is desired (shown On) for prohibiting unauthorized users from accessing the utility.

The Enter Random Text pattern window allows user entry of user-defined blocks of text that can be used to replace the original text in the file in Substep 1(*b*). The Rescue File section allows a user to enter a file (or list of files) to be scrubbed with one keystroke.

The File names entry section (middle) allows the user to define the File Name and/or Extensions to be used while renaming the files to be the utility. Underneath this a number of checkboxes appear to turn on specific user options, including "Prompt For: Read only files" (application warns the user if about to delete a "Read only" file); "Prompt For: Folder/Directory" (application warns the user if about to delete a Folder or Directory); "Prompt For: System files" (application warns the user if it is about to delete a "System" file); "Prompt For: Every Delete" (application warns the user if it is about to delete any file/folder).

There are also a number of Display Options. The "Display Wipeout bin", when turned on, keeps the Wipeout bin visible on desktop. The "Display Wipeout Progress Notifier", when turned on, displays the progress while wiping out selected file(s)/folder(s). The "Display popup message after file/folder wipeout", when turned on, displays a message in a popup window detailing the status of the recently completed wipeout operation on the selected file(s)/folder(s). The "Log in/Log out" facility allows logging into and out of the Wipeout Utility. The "Show/Hide Wipeout bin" display option displays or hides the Wipeout bin on the desktop. As described below, the Wipeout bin is an icon to which the user can drag files to be deleted. The "Wipeout Help" display option displays help information on how to use Wipeout utility. The "Rescue Me" display option, when selected, will wipe out all the files designated in the "Rescue File" section without any need for confirmation or login.

Finally, the "Settings/Option" display allows changes to the preset values of the various wipeout related options.

A tabular definition of the Setup Options follows:

| Option | Description |
|---|---|
| Number of Additional Repeats: | How many times N, The utility should overwrite the information. The utility will perform, by default, one round of replacing original contents by random text pattern. User can set N to have additional passes of overwrites. This is to make a recovery very difficult (almost impossible by normal means of recovery tools). Ideal setting should be value N = 3. |
| Password Protection: On/Off | User can enable password protection. This protection is for prohibiting un-authorized users from accessing the the WipeOut utility. When the protection is "on" - the executable will ask for the password before launching. If the password does not match, then the executable will not allow the user to use the program to erase any information. |
| Random Text: | This is user-defined block of text that can be used to replace the original text in the file. Wipeout will alternately replace original text with this text block, and its own randomized text block, thereby making it much harder to use conventional recovery tools. If the information is recovered, this user-defined text block makes the "recovered text" look much more legitimate than purely random patterns (hopefully avoiding more strict scrutiny). |
| Rescue File | Here, user can set up a file (or list of files) that user wants to be scrubbed with one keystroke. This is for emergency wiping out of critical files. Here, user can set the files that user considers extremely sensitive and in the event of emergency situations, user can select "Rescue Me" option of the utility which deletes all these files. When user selects "rescue me" option, password protection is overwritten. |
| File Names & Extensions | User can define the file names and extensions to be used when renaming files to be scrubbed. The list is practically unlimited. The executable will randomly select the files |

-continued

| Option | Description |
|---|---|
| | name entered from this list, and automatically adjust the name to match the length of original file file name to be scrubbed (by adding or removing characters). Additionally, the Setup Screen may provide one or more of the following CheckBox Settings: |
| Prompt For: Read only files | When turned on: Application warns the user if it is about to the utility a "Read only" file. User can make a decision if it is okay to the utility that "Read only" file. |
| Prompt For: Folder/ Directory | When turned on: Application warns the user if it is about to the utility a Folder (Directory). User can make a decision if it is okay to the utility that Folder (Directory). |
| Prompt For: System files | When turned on: Application warns the user if it is about to the utility a "System" file. User can make a decision if it is okay to the utility that "System" file. |
| Prompt For: Every Delete | When turned on: Application warns the user if it is about to the utility any file/folder. |
| Display Options | |
| Display Wipeout bin | When "turned on" - Keeps Wipeout Bin visible on desktop (at present to display at the middle height at the right edge of the screen). |
| Display Wipeout Progress Notifier | When "turned on" - Displays user progress while wiping out selected file(s)/folder(s). |
| Display popup message after file/folder wipeout | When "turned on" - displays a message in popup window about the status of the recently completed wipeout operation on selected file(s)/folder(s) |
| Log in/ Log out | To log-in and out of the Wipeout Utility |
| Show/Hide Wipeout bin | To display or hide the Wipeout bin on the desktop. User can drag files to be deleted in the wipeout bin when it is visible. |
| Wipeout Help | To display the help on how to use Wipeout utility. |
| Rescue Me | To delete all the files setup in "Rescue File" list. When selected, application will wipe out all the files that are set in the "Rescue File" section without any confirmation or login. |
| Settings/ Option | To change the values of the various wipeout related options |
| Save/ Restore Defaults/ Close | To save the indicated options, restore default values, and close the Setup Options Screen |

Given the foregoing "Setup Options" either manually entered or default values, when the user initiates the utility it will execute a scrubbing sequence pursuant to the following four-step processing logic:
1. Overwrite all data blocks associated with a given file;
2. Remove the references for the file from Windows™ environment (Recent List, Documents short cuts, registry references to the file);
3. Rename the file;
4. Delete the file.

Each of these main steps is described in more detail below.
Step 1: Overwriting information.
Overwriting information may include two sub steps.
Step 1.a: Overwriting information with random text; and
Step 1.b: Overwriting information with the User Defined Block of Text.
Step 1 is performed N times (at least once) per execution of the utility on any given file, and any number of iterations are possible. By default, the first of N passes employs a substep 1.a wherein the file data is overwritten with random text, and the second of N passes employs substep 1.b wherein the file data is overwritten with the User Defined Block of Text, and so on. Based on the "Number of additional repeats" set by the user, the utility will alternatively perform Steps 1.a and Step 1.b.

During Step 1.a: the utility will overwrite information with random text by generating random text comprising any characters from following set:

| "A"-"Z"- | An alphabet (Uppercase) |
| "a"-"z"- | An alphabet (lowercase) |
| "0"-"9"- | number between 0 to 9. |

Specifically, the utility will open the designated file and begin replacing each block of data with the random text. All the characters in each block associated with the selected file will be filled with random characters as per above in a random sequence. While doing so, the utility avoids making any change in the file size. This ensures that blocks that are currently in use by the designed file(s) will be overwritten with the new random data but that no other block gets touched, nor does the file allocation table. The footprints of the indicated file(s) on the storage medium are exactly followed and overwritten with the random data without making any changes in the file store links or blocks.

If the utility proceeds to a substep 1.b wherein the file data is overwritten with the User Defined Block of Text, the utility will use the User defined block of text as set in the Options Setup screen to replace the existing blocks of information. The utility will open the file and start replacing each block with this user-defined text. Again, all the characters in each block associated with the selected file will be filled with the user-defined characters as per above sequentially. Again, the utility avoids making any change in the file size and the footprints of the indicated file(s) on the storage medium are exactly followed and overwritten with the random data without making any changes in the file store links or blocks.

After Step 1 (successful overwrites with the random/user-defined text for N times) the utility proceeds to Step 2: Removing the references to the file. Here the utility removes all the references to the file from the Operating System, e.g. from the list of "Recent Documents", short cuts to the file, Windows™ registry entries referencing to that particular file, etc. This way, there is no foot print of that file left on the computer.

After Step 2 (Removing the references to the file), the utility proceeds to Step 3: Renaming the file. At this step the utility changes the File Name and/or Extensions in accordance with the user Setup Options. Specifically, as described above in the Options section, there is facility to set up default File Names and/or Extensions to be used as replacements. This way, the user can employ easy to remember names. For example, if user has a hobby of traveling, the user can set up names related to travel. The point is to protect the privacy of the data files being scrubbed by the user. By renaming the file with user-defined text the utility reduces (almost eliminates) the chances of someone recovering the original file name that was scrubbed.

The utility automatically selects a user-defined name from this list of User Defined names, and modifies it as necessary to conform to the exact number of characters in the original filename that is in process of getting scrubbed. The utility then renames the file with this newly formed name. By keeping the same number of characters, the utility ensures that the File Allocation Table entries will not be altered in the memory map. It also ensures that the new characters only replace previously meaningful names that had relevance to the original file that is getting scrubbed.

After Step 3 (Renaming the file), the utility proceeds to Step 4: Deleting the file. Here the utility automatically deletes the file and removes it from the "Recycle" folder. Now, there is absolutely no trace of the original file and it cannot be reconstructed.

As an operating example for Steps 3 and 4, assume that the file to be scrubbed is named SwissAcct2007.xls. Now assume that the replacement File Names set up in the user Option Setup are as follows:

| # | Name |
|---|------|
| 1 | GrandCanayon |
| 2 | LasVegasTrip |
| 3 | OfficeParty |
| 4 | Nevada |
| 5 | Newyork |
| 6 | Disney |
| 7 | Photos |
| 8 | MD |
| 9 | India |
| 10 | Bahama |

Note that the name of the file to be scrubbed has 13 characters in its primary name ("SwissAcct2007").

The utility may randomly select one of the user-defined names, say for example the $6^{th}$ label—"Disney". The utility will then generate a name that starts with "Disney" and auto-fill the rest of the characters so that the name remains 13 characters long. Thus, it may transform Disney into "Disney01 sAnDr". The utility will then rename the file "SwissAcct2007" with "Disney01sAnDr". Then at Step 4 the utility will delete the Disney01sAnDr file. Again, the process of overwriting data structures any number of times, removing all references to the data structure in the operating environment, renaming the data structure, and finally deleting the data structure, ensures utmost security of the scrubbed data.

Figure 7:
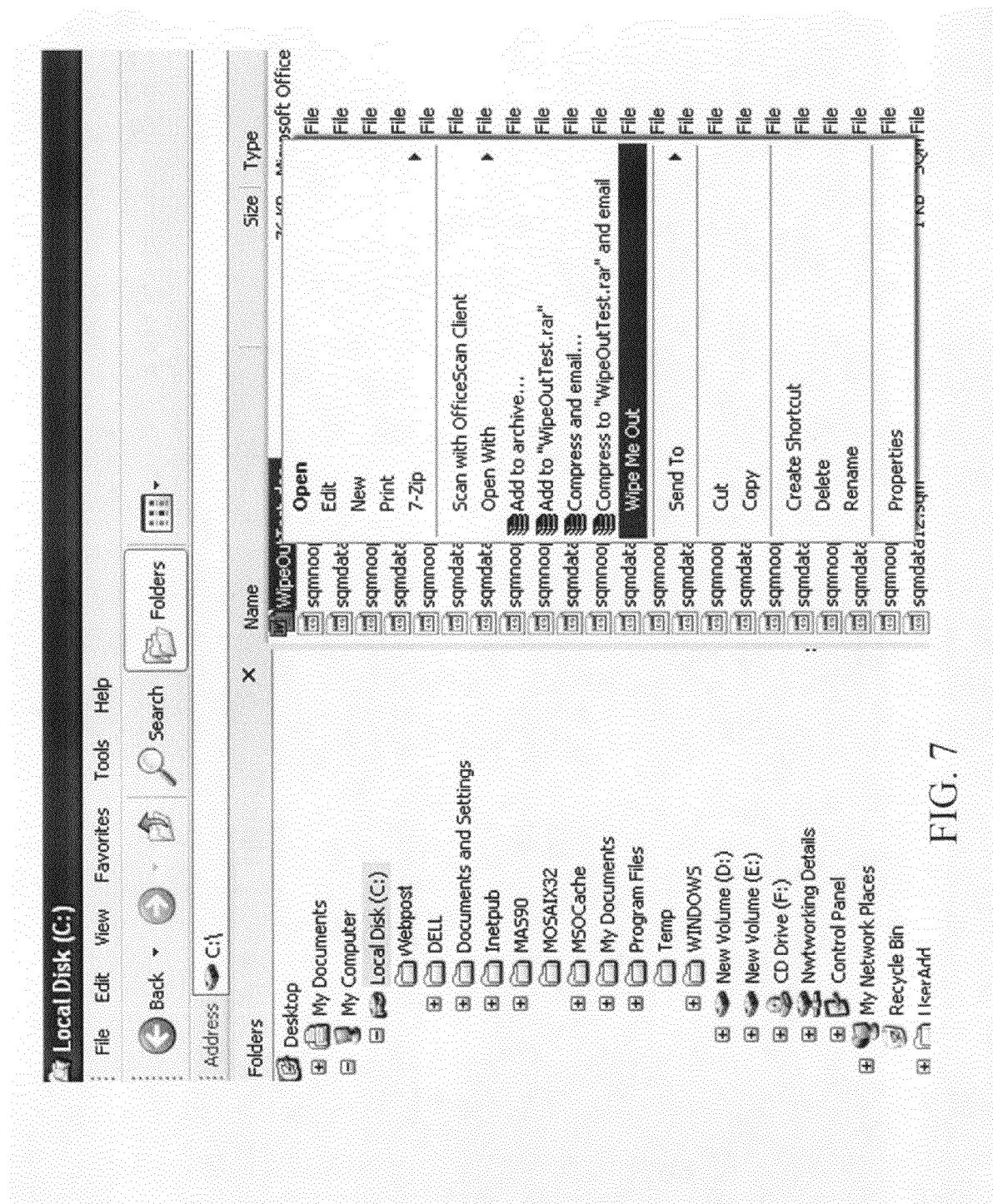
FIG. 7 is a screen print of the "Wipe me out" right-click option added to the Windows Explorer.
Figure 8:
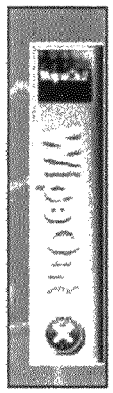
FIG. 8 is a screen print of the "Wipeout" utility bin added to the Windows™ desktop.

After installation of the utility, the utility integrates with the Windows™ environment to present various paths to execution. Specifically, the user may execute the utility as follows:

1. As shown in FIG. 7, a right click "Wipe me out" option is added to the Windows Explorer, and the user can select the "Wipe me out" feature that is available on a right click on any file(s), folders or directories highlighted in Windows Explorer™. Whenever the user is working within the Windows Explorer™, the user can activate the utility simply by selecting this menu option that is available on the right click on the selected files/folders. When the user initiates a WipeOut process on any Windows Explorer™ file or folder, a series of precautionary prompts are displayed. The user is always prompted with "Are you sure that you want to continue with Wipe-Out?" Selecting yes continues the operation. If the user has chosen to WipeOut a folder or directory, the user is prompted with "You have selected a Folder/Directory. Are you sure that you want to WipeOut the Folder/Directory?" Selecting yes continues the operation. Additionally, if the user has chosen to WipeOut a read-only file, the user is prompted with "You have selected a Read-Only file. Are you sure that you want to WipeOut the Read-only file?" Again, selecting yes continues the operation.
2. As shown in FIG. 8, a "Wipeout Bin" is added to the Windows™ desktop. By dragging any selected file(s)/folder(s) into The "Wipeout" utility bin, the user can activate the utility. Once user has made a selection of files(s)/folder(s)—user just need to drag those selected files (by holding down the left mouse key and moving mouse over the utility bin) to the utility bin. The same above-described procedure is followed.
3. Referring back to FIGS. 2-4, the user may initiate the "Wipeout" executable from the Windows™ Start Menu shown in FIG. 2, the "Wipeout" shortcut added to the Windows™ desktop as shown in FIG. 3, or the Windows Command Line as shown in FIG. 4. In each case the user can activate the executable by clicking on the respective shortcut. Once presented with the user interface a file/folder/directory browse function is provided to allow selections to be scrubbed.
4. The WipeOut executable may be accessed by direct call from a provided scheduler utility, or from the Windows™ command line, or other third party program. The "Wipeout" scheduler is installed as a runtime executable that allows a user to schedule the scrubbing of files/folders. FIG. 9 is a screen print of an exemplary Scheduler Job List. The list of predefined scheduled WipeOut jobs is shown in the window inclusive of a job descriptor, the scheduled interval (one-time, user-defined interval, daily, weekly, monthly), the start-time for the job, the date upon which the job was created, the next run, and the last run. The user can schedule jobs for files, folders and/or directories, simply by clicking the ADD/EDIT button at the bottom, which engenders a dialogue of windows allowing the user to define all job details. Once done, the job) along with all details) is added into the Scheduler Job List.

Figure 10:
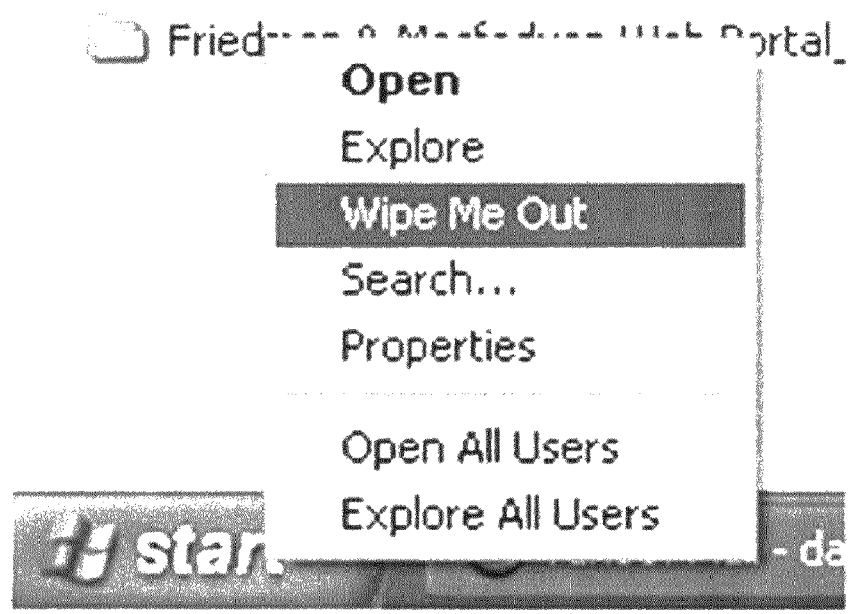
FIG. 10 illustrates The Rescue me selection which is also added as a shortcut to the Windows Start Menu.

Finally, FIG. 10 illustrates The Rescue me selection which is also added as a shortcut to the Windows Start Menu. This again initiates a single click file deletion option referenced above and provides the shortest user-path to secure deletion of files and folders.

It should now be apparent that the software utility disclosed herein inclusive of graphical user interface (GUI) and scrubbing method allows a user to preset a desired data shredding operation including overwriting data structures any number of times, removing all references to the data structure in the operating environment, renaming the data structure, and finally deleting the data structure, thereby ensuring utmost security of the scrubbed data.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A software method for scrubbing data files, each file having an associated filename and a plurality of blocks of data stored on a computer storage medium, one of said blocks of data containing an end-of-file indicator (EOF), said method comprising the steps of:
    soliciting user-input of a plurality of user-selected file names;
    overwriting all of the plurality of blocks of data including said EOF block corresponding to each of said files a user-defined number of times;

removing all references to the overwritten data files in an operating system environment, including all references in an operating system recent file list, short cut, and operating system registry;
renaming each overwritten file by the substeps of
  randomly selecting one from the plurality of user-selected file names,
  modifying said randomly selected filename to have the same number of characters as said associated filename,
  renaming one of said overwritten files with said randomly selected and modified filename, and
  repeating said randomly selecting, modifying and renaming substeps for each of said overwritten files; and
deleting the renamed and overwritten data files;
whereby utmost security of the scrubbed data is assured.

2. The software method according to claim 1, wherein a user may specify user-defined blocks of text for replacing original blocks of text during said step of overwriting all of the plurality of blocks of data.

3. The software method according to claim 2, wherein said step of overwriting all of the plurality of blocks of data further comprises alternately replacing original text with said user-defined blocks of text and randomized text blocks.

4. The software method according to claim 3, wherein said step of overwriting all of the plurality of blocks of data further comprises overwriting the same number of characters as in the original text block.

5. The software method according to claim 1, wherein said step of soliciting user-input of a plurality of user-selected file names comprises both user-defined file names and extensions to be used as replacements during said renaming step.

6. The software method according to claim 1, wherein said step of deleting said renamed and overwritten data files further comprises deleting the data structures and removing them from the operating system recycle bin folder.

7. The software method according to claim 1, wherein said step of soliciting user-input of a plurality of user-selected file names further comprises presenting a user with a user-interface soliciting user-input of a plurality of desired scrubbing parameters including user password, a plurality of user-selected file names, and a user-defined number of times for overwriting all of the plurality of blocks of data including said EOF block corresponding to each of said files.

8. The software method according to claim 7, wherein said step of presenting a user with a user-interface further comprises soliciting user-input of a runtime schedule, and said step of overwriting comprises automatically overwriting all of the plurality of blocks of data including said EOF block according to said runtime schedule.

9. A system for scrubbing data files, each file having an associated filename and a plurality of blocks of data stored on a computer storage medium, one of said blocks of data containing an end-of-file indicator (EOF), comprising a plurality of software instructions stored on a computer-readable medium for instructing a processor to execute the steps of:
  soliciting user-input of a plurality of user-selected file names;
  overwriting all of the plurality of blocks of data including said EOF block corresponding to each of said files a user-defined number of times;
  removing all references to the overwritten data files in an operating system environment, including all references in an operating system recent file list, short cut, and operating system registry;
  renaming each overwritten file by the substeps of
    randomly selecting one from the plurality of user-selected file names,
    modifying said randomly selected filename to have the same number of characters as said associated filename,
    renaming one of said overwritten files with said randomly selected and modified filename, and
    repeating said randomly selecting, modifying and renaming substeps for each of said overwritten files; and
  deleting the renamed and overwritten data files;
  whereby utmost security of the scrubbed data is assured.

10. The system for scrubbing data according to claim 9, wherein a user may specify user-defined blocks of text for replacing original blocks of text during said step of overwriting all of the plurality of blocks of data.

11. The system for scrubbing data according to claim 10, wherein said step of overwriting all of the plurality of blocks of data further comprises alternately replacing original text with said user-defined blocks of text and randomized text blocks.

12. The system for scrubbing data according to claim 11, wherein said step of overwriting all of the plurality of blocks of data further comprises overwriting the same number of characters as in the original text block.

13. The system for scrubbing data according to claim 9, wherein said step of soliciting user-input of a plurality of user-selected file names comprises both user-defined file names and extensions to be used as replacements during said renaming step.

14. The system for scrubbing data according to claim 9, wherein said step of deleting said renamed and overwritten data files further comprises deleting the data structures and removing them from the operating system recycle bin folder.

15. The system for scrubbing data according to claim 9, wherein said plurality of software instructions stored on a computer-readable medium include instructions for instructing said processor to present a user with a user-interface soliciting user-input of a plurality of desired scrubbing parameters including a user password, a plurality of user-selected file names, and a user-defined number of times for overwriting all of the plurality of blocks of data including said EOF block corresponding to each of said files.

16. The system for scrubbing data according to claim 15, wherein said plurality of software instructions stored on a computer-readable medium include instructions for instructing said processor to present a user with a user-interface soliciting user-input of a runtime schedule, and said step of overwriting comprises automatically overwriting all of the plurality of blocks of data including said EOF block according to said runtime schedule.

* * * * *